(12) United States Patent
Srinivasan

(10) Patent No.: US 11,343,279 B2
(45) Date of Patent: May 24, 2022

(54) SYSTEM AND METHODS FOR DEVELOPING SECURE PLATFORM TO DELIVER END-TO-END PROTECTION AND SAFETY FOR TRANSACTIONS USING MULTI-DIMENSIONAL, MULTI-LAYERED SECURITY CONTROL

(71) Applicant: Ravishankar Srinivasan, Bangalore (IN)

(72) Inventor: Ravishankar Srinivasan, Bangalore (IN)

(73) Assignee: Ravishankar Srinivasan, Bangalore (IN)

( * ) Notice: Subject to any disclaimer, the term of this patent is extended or adjusted under 35 U.S.C. 154(b) by 459 days.

(21) Appl. No.: 16/382,098

(22) Filed: Apr. 11, 2019

(65) Prior Publication Data
US 2019/0319986 A1 Oct. 17, 2019

(51) Int. Cl.
*H04L 9/40* (2022.01)
*H04L 29/06* (2006.01)

(52) U.S. Cl.
CPC .......... *H04L 63/20* (2013.01); *H04L 63/105* (2013.01); *H04L 63/123* (2013.01); *H04L 63/0272* (2013.01)

(58) Field of Classification Search
CPC ..... H04L 63/20; H04L 63/123; H04L 63/105; H04L 63/0272; H04L 43/028; H04L 63/0209
See application file for complete search history.

(56) References Cited

U.S. PATENT DOCUMENTS

| | | | |
|---|---|---|---|
| 10,541,806 B2 * | 1/2020 | Rosenoer | H04L 63/08 |
| 11,074,648 B1 * | 7/2021 | Duccini | H04L 63/0807 |
| 2018/0293553 A1 * | 10/2018 | Dembo | G06Q 20/0655 |
| 2021/0075619 A1 * | 3/2021 | Chereshnev | H04L 9/3297 |

* cited by examiner

*Primary Examiner* — Christopher A Revak
(74) *Attorney, Agent, or Firm* — Barry Choobin; Patent 360LLC

(57) ABSTRACT

The embodiments herein disclose a system or a platform for multi-dimensional, multi-layered security control. The system includes Identity management module, Payload data handling module, heuristic network Management module, Application interface Manager, and an encapsulator or Modulator while leveraging a dynamic Validator. A Shielding protector is provided for safety of servers, devices, systems and clouds. The identity management module safeguards passwords, PINS, user information, and device data. The dynamic ID, time-based, multi factor elements is used to embed both ID and data. The Payload data handling module provides data wrapping, random-segmenting and flow-chains. The heuristic network Management module performs routing of watermarking, and obfuscation map tracker. The Application interface Manager works on DDMLSORI techniques to block out any unwanted Access while validating actual transactions using Qualifiers. The Encapsulator or Modulator and Validator module fortifies system resources, applications, databases, message exchanges with control mechanism.

5 Claims, 10 Drawing Sheets

SYSTEM AND METHODS FOR DEVELOPING SECURE PLATFORM TO DELIVER END-TO-END PROTECTION AND SAFETY FOR TRANSACTIONS USING MULTI-DIMENSIONAL, MULTI-LAYERED SECURITY CONTROL

CROSS-REFERENCE TO RELATED APPLICATION

The embodiments herein claim the priority of the Indian Provisional Patent application with serial number: 201741036172 filed on Oct. 11, 2017 and subsequently postdated by 6 Months to Apr. 11, 2018 with the title, "SYSTEM AND METHOD FOR DEVELOPING SECURE PLATFORM TO DELIVER END-TO-END PROTECTION AND SAFETY FOR TRANSACTIONS USING MULTI-DIMENSIONAL, MULTI-LAYERED SECURITY CONTROL", and the contents of which is incorporated in entirety as reference herein.

BACKGROUND

Technical Field

The embodiments herein are generally related to security control and management systems employed within a computing environment. The embodiments herein are particularly related to enhanced security model and mechanism for transactions and data inter-change within the computing environment. The embodiment herein is more particularly related to a systems and methods for developing a robust security platform to provide a differentiated approach and model to deliver end-to-end protection and safety for the transactions on an end-to-end basis, using multi-dimensional, multi-layered security solution.

Description of Related Art

The Internet is a public network for electronic communication. Also, the Virtual Private Network or virtually leased network (VPN) signifies a Wide-Area Network (WAN) defined by the IP (Internet Protocol) protocols that is used as a medium/conduit for communication and hence forms the backbone for inter-connectivity across the globe for a wide variety of organizations, governmental agencies, military and commercial organizations. Typically, the organizations have one or more LANs, VPNs, for point to point or even for point to multi-point network connectivity across various office locations to share information with other remotely located organizations. Any mode of connectivity including the Internet, VPN or a private WAN networking implemented at office locations are prone to danger of hacking and data breaching. There is a massive increase in ID-stealth, data theft, database corruption, extraction of critical enterprise data due to high dependence on Internet and electronic communication. Further, there exists security risks in the form of adversaries seeking to disrupt or infiltrate the organization's (electronic mode of working) mission by interfering with the organizations' networks.

The existing security devices employ firewalls and next-generation firewalls to protect systems in a network against unauthorised access. The firewalls help in basic level URL filtering, eliminating compromised data-packets, and blocking data transfers that are suspicious in nature and are usually diagnosed using a set of defined patterns or signature. These patterns are always in catch-up mode and cannot prevent zero-day attacks.

However, the increase in Hacking and Attacks have grown in more than unimaginable ways since the mode of thieving/ex-filtrating info has advanced much better to defeat all available solution and techniques to catch them and block them or evade them. Several security devices that exist today are designed to keep the external adversaries from gaining an access to a LAN such as Firewalls (now termed as Next-generation Firewall) directly or even surreptitiously. This is used as the basic line of defense to protect the systems, devices on the internal network against unauthorized access. While the firewall might at its basic level enable some URL filtering, Sniff and separate out compromised Data-Packets, the firewall is largely designed to check out or identify the authorized user gaining access, an invocation by the user and the kind of data or information transacted or transferred or accessed by that person while also validating whether that person is even permitted to perform such transfers and transactions. The firewall might even lead to a blocking of that person or the actual exchange of data/info; if the same is found to be suspicious in nature. Depending on the pre-define model of validation (which can be compromised unfortunately) the act of information exchange is either permitted or denied and then the systems and devices might engage in performing the transactions/exchange in a structured flow model. This means that communications of data (commonly called datagrams or "packets") from known machines is only allowed to pass through to the other end of the chain. This is accomplished by monitoring network IP addresses on these packets, which correspond uniquely to a particular machine, and TCP service ports, and which usually identifies the user, along with the entity (system/device/location) that is recognized as an ingredient/element for the establishing the transaction-map and also defines the mode of exchange such as specific type of software application like e-mail, ftp, http and the likes. The combination of Firewalls (these days it's the latest Next-generation Firewalls), the Intrusion Detection (IDS) and Intrusion Prevention (IPS) systems play the role of a clear Gate-Keeper by attempting to STOP or BLOCK unauthorized access/use of system resources or any data exchange unnecessarily if that cannot be validated through Filtering and are Authorization & Authentication process. Any such Validation, Authentication & authorization is again limited to previously known entities (Good & Bad) only and in spite of all the learning-capability, it still suffers this limitation (made to even to err on the safe side). Also, the other danger is that these lists and modes are compromised by themselves thereby leading to the system being built around a known lacunae. All these existing methods have been proved innocuous as is evident from the kind of attacks (nature of attack, attack vectors), breaches, ransomware and stealth activities that have been on the rise from 2012 to 2018 and this too in spite of awareness growing leaps and bounds and Cyber-Security investments going up. Another closer look at Today's list of attacks that qualify as popular Hacking/Theft mechanisms, seems to point largely to a well-orchestrated mechanism built around Data-Breaches, Ex-filtration and introduction of Malware (leading to Ransomware and Encrypting of the Database) making these TOOLS IN-EFFECTIVE, and simply as the handiwork of the Hacker who has either exploited a gap in the software or the model or the user's gullibility. So, there is now a clear admission that Hacking is a Global menace. It is now complete and resonates as a huge problem that seems to give the Hackers an edge. Hence there is a need to deliver a full end-to-end protection to even defeat the best HACKERS in their own game/effort. As advancements come in the field of Cyber Security Tools, experts felt that by using Extensive & Deep Analytics and also by extending the canvas of Artificial Intelligence, the Security-decode-algorithm is enhanced to trap unwanted access/suspicious transfers or even block some kind of code-invasion (as the case may be). This is done by triggering the computation algorithm to defend the systems and also by blocking the intruder. This is generally categorized as SIEM. But the hackers have gone way ahead that SIEM has now become liability owing to false positives/alerts it usually generates making it almost impossible for effective use. It is well known that organizations which spent a lot of money in implementing some of these kinds of Tools, are now ready to throw it away or TURN it OFF/down. So much so, it's almost a direct admission that today's solutions are almost incapable of protecting against hacking and breaching.

Moving deeper into the intuitive techniques adopted by today's tools and solutions, the existing solutions or security systems use typical encryption mechanism that are easily broken. There is enough evidence available today to prove that even a 2048-Bit Encryption or for that Hash-Algorithms that work on SHA-1, SHA-2 model are broken into with ease. TLS which went through several revisions is still under the pump and TLS ver 1.3 is also under by fire. With several Cloud computing resources available on-demand and Quantum-computing the new fad, it has made ENCRYPTION look like a toy that is peeled off without much stress/strain. In fact, the SPEED with which it is possible to break-in renders/turns encryption into a myth. That is largely because the Pay load data in existing system is not wrapped with user-customized/user-specific/user-opted control information that not only enhance security but also ensure full safety as no one else is enabled to access it or open it or use it without the direct involvement of the Original Authorized user as proposed by our Solution here-in. Further, today any Payload data is NOT validated at the time when it is opened. Still further there is also no blocking mechanism for preventing the sharing or transfer or even copying of the payload keeping the genuine/authorized user at bay. The misuse of the payload data is also extended to Viewing of Enterprise Data/Invoking any APP Functionality just because someone is given an access to it while signing-in and/or data-elements within a Transaction. This problem is largely because the existing systems do not embed payload data with any User-Customized-Control, thereby making it an easy prey to data theft. It is therefore pertinent to highlight that this problem of Breaches and Data-Theft is not solved entirely. unless and until there is complete control over Pay-Load Data from the time of Origin till its expiry/validity (all the time in motion, transit and rest and even while it is actually allowed to be accessed or viewed under a defined permission as granted by the Actual-User.

Hence, there is a need for advanced systems and methods that are built to comprehensively address all vulnerabilities, largely classified as Identity, Data, Network, Interface, and Application(s), across a computing environment/organization/location that are believed to be unsafe in real terms. Further, there is a need for advanced systems and methods that are built to comprehensively address all vulnerabilities, across a computing environment comprising the Devices, Computing entities such as Servers, desktops, Hosts, Cloud-clusters etc. still further, there is a need for a system and method that is intuitive and delivers a dynamic modeler/automated mechanism for facilitating True-ID-management and Wrapped-Payload Data handling in a dynamic way to prevent hacking or sniffing out by the intruder. Yet further there is a need for Powerful systems and methods for providing multi-dimensional, multi-layered security control to deliver end-to-end protection and safety for transactions. Yet there is a need for systems and methods for developing a robust security platform to provide a differentiated approach and model to deliver end-to-end protection and safety for the transactions on an end-to-end basis, using multi-dimensional, multi-layered security solution.

The above-mentioned shortcomings, disadvantages and problems are addressed herein, and which will be understood by reading and studying the following specification.

OBJECTIVES OF THE EMBODIMENTS HEREIN

The primary object of the embodiment herein is to provide end-to-end protection and safety for transactions in a computing environment by using a multi-dimensional, multi-layered security system.

Another object of the embodiment herein is to provide a security system and methods for generating dynamic ID for users using Multi-factors inclusive of biometric credentials and other personally identifiable elements of a given individual and or such trusted participants who are also enabled to lend an element of control to the Customized-and-Instantly-Generated-Combo-ID of sorts, to vary the personally identifiable elements with known aspects that are fully reference-able with authorized third party or duly appointed Govt agencies that are enabled to categorically verify and validate elements that are used to generate a customized ID that is used for a given transaction only and valid for a given time alone.

Yet another object of the embodiment herein is to provide a multi-layered security system that is modular and facilitates payload data handling in a robust manner to prevent extraction of payload data by unknown entities or intruders who is not provided with the right permissions to even handle or open the payload data alone.

Yet another object of the embodiment herein is to provide security system and method that safeguards elements such as Identity, User data, Network, Interface and Applications that form part of the entire flow chain for any transaction or information exchange as envisaged by the Authorized Originator/User.

Yet another object of the embodiment herein is to provide a security system and method with heuristic (self-learning and adaptive) network management techniques that allows for multi-routing, obfuscation, no-traceability by intruders and other control aspects that leave a signature or watermark specific to the flow as well as envisaged for a given transaction at the time of invocation by the Authorized Originator or User.

Yet another object of the embodiment herein is to provide a security system with an application interface that blocks any unwanted access and validates actual transactions using qualifiers, thereby avoiding unwanted messages or disruptive-information that an intruder might introduce to either modify or corrupt the use of the systems that the Authorized User or the enterprises use or invoke for the purpose of the performing a given set of transactions or information exchange.

Yet another object of the embodiment herein is to provide a security system with encapsulator or dynamic-shield for fortifying system resources, applications, databases, and message exchanges with control mechanisms.

Yet another object of the embodiment herein is to develop a system and method by providing a contiguous and matrix mapped solution with complex validated filters for the purpose of only extracting the minimal set of information that needs to actually flow for the fulfillment of a given transaction or information flow (much like a shadow functionality running on a side-band-host but still replicating the features of a given Application which the genuine user is intend to use or invoke or triggering or accessing for a given purpose only) in order to ensure protection is active, and is embodied through the entire cycle.

Yet another object of the embodiment herein is to develop a security system and method providing a unique ID or Global ID number (GIN) for every individual that generates or concatenates a Complex model of user ID which is dynamic, random and leverages user-opted, user-specific, user-customized parameters.

Yet another object of the embodiment herein is to develop a security system and method providing every individual with a unique ID or Global ID number (GIN) that is dynamic and is always a combinatorial parameter that is chosen by the User to invoke just that instant only for that transaction but still encrypted and wrapped uniquely for a validated and restricted use for a given event and time Yet another object of the embodiment herein is to develop a security system and method to provide a unique ID or GIN that is further used to embed/wrap the payload data that the Genuine User intends to transact/apply/use/respond with/demand/incorporate/edit/validate/delete/share/modify under specific controls (based on a case and based on the functionality of that application that the Genuine user invokes at any given time).

These and other objects and advantages of the embodiment herein will become readily apparent from the following detailed description taken in conjunction with the accompanying drawings.

SUMMARY

The various embodiments herein disclose an enhanced security mechanism for transactions by deploying a multi-dimensional, multi-layered security solution that incorporates new degree of Validation and Control thereby lifting/increasing the current Authentication & Authorization mechanism by two notches up. According to an embodiment herein, a system and method is provided to develop a robust platform for delivering end-to-end protection and safety for transactions with spatially distributed data using a multi-dimensional, multi-layered security Solution. According to an embodiment herein, a robust platform is planned to be developed to ensure/provide a complete secure-zone for Transactions. The robust platform is configured to manage the Flow-Control to provide an End-to-End security for the transactions, the pay load data and the spatially distributed data and applications that are used by Enterprises and User invoked Applications. The robust platform is further configured to enable an Armoured Data Transfer across the entire transaction-chain by using and/or a matrix of Adjunct network, and using Dynamic Routing Mechanisms as well as segmented and granulated data that needs to be validated and combined later to gain the full information—which happens only when the user-customized controls are applied in the authorised e-presence of the original user. The robust platform is further configured to provide a Variegated Control and Validation method that improves/increase as the process of ensuring genuine transfers by several notches up, thereby providing full protection for any given transaction at any given instant. The new Solution technique provides for an all-pervasive Controller function enabling the Internet of Things (IoT) elements using an Intelligent Handler at the point of Origination as well as destination—introducing such elements as a shield-cum-protective cover. This kind of additional control (with locational info, network-identifiers, Route-Map-Tags, Validation-Markers as developed and delivered at that instant by the Handlers and Controllers is configured to enforce and ensure that NO HACKER from other parts of the world invokes or reads or duplicates or repeats or copies these structured-flow-controlled ID, Pay-Load-data, Functionality-Index, Information-frame-water-markers—thereby making it totally safe from hacking through a definitive conduit as managed by the network systems that ensures no trail or trace is allowed. The network management modeler is also configured to add the elements of control and splitting of the wrapped data-exchange primarily to ensure that no intruder comes in to way lay/access the information or even decipher the pattern or unravel the wrapper which the packets constantly undergo in terms of additional dynamic layering. Such layering is both composite and laced with validation parameters so that the access to data is refused or sniffed if the packet is even attempted to be disturbed in its dynamic path (which too is not something the intruder is able to actually find but it safeguards even against such unlikely events to make it fool-proof.

According to an embodiment herein, a system and method is provided with a SAFETYWARE web or mobile based application. The SAFETYWARE web or mobile based application is configured to provide a multi-layered platform with robust interface; a Device-Specific (OS) Communication Services Layer; a User-Specific Graphics and Data Management Wrappers; and a Device-Hardening module for Secured Transfers and Customized Interface. The system provides a comprehensive method of safeguarding the RESOURCES within the DEVICE or SYSTEM or even as spread across the NETWORK (LAN/WAN) or say a CLUSTER of SERVERS/EQUIPMENT/COMPUTING ELEMENTS that create SAFETY LAYERS and CONTROL AGENTS to manage as well as protect any designated transaction as invoked by a Genuine User/Application at any given instant. Such transactions are a result of an inherent functionality that is applicable as relevant to a given Application. The SAFETYWARE delivers Validation mechanisms that are applied to any User invoked or requested functionality of a given APP or the purpose of data exchange (say E-MAIL, Social networking tools etc.,) and thus ensure safety to such a command-flow by using synchronized controls. Thus the SAFETYWARE is a modeler and Controller for any APP or User commands that are now configured as the trigger for invoking any Transaction or info Exchange in a defined manner that is commonly applied or used today.

According to an embodiment herein, a security system and method is disclosed for providing a dynamic ID including personally identifiable elements of a given individual (referred to as GENUINE USER) apart from his/her biometric credentials and other inputs that are variably applied as when needed with time. The security system is enabled to handle Payload data and address the five vulnerable zones of attack such as Identity, User-data, Network, Interface and Application. The system and method provides a heuristic network management for network security. The system provides a means for a matrix mapped solution that contiguously applies its vectors, parameters, algorithms and system-modeler-configurators that ensures that the full protection is active throughout the entire chain. Also, the system provides a unique identifier (ID) or Global Identifier (GIN) unique ID or GIN for every individual that combines user ID with payload data. The system and method provides a solution which runs on a PLATFORM that invokes a mix of Protocols (and missing of such protocols is dynamically decided and instructed to be adhered to for a given transaction and/or data exchange) thereby ensuring that the intruder is both unaware and unable/does not comply with the demands of validation even when the transaction and data-exchange is in progress through the network.

According to an embodiment herein, the system and method provides a platform for multi-dimensional, multi-layered security solution. According to an embodiment herein, the system comprises an Identity Management module, a Payload Data handling module, a Heuristic Network Management module, an Application Interface Manager, and a System Encapsulator module or System Hardening module.

According to an embodiment herein, the Identity Management module is configured to safeguard passwords, PINS, user information, and device data. The identity management module is configured to provide a dynamic ID that is time-based and configured based on multi factor elements that user has the choice (several options to invoke dynamically—even though how they are combined is left to the system and it's computing model-engine) to customize at various points. The time-based, dynamic ID, configured with multi factor elements are used to embed both ID and data. The identity management module is provided with a reconstruction algorithm called Validation & Control mechanisms a new innovation that provides for a tremendous advancement over the existing Authorization & Authentication models that are restrictive in nature for its functioning. Hence there's a critical need for incorporating new models and methods to address Today's limitations by pushing for a more advanced and deeply structured method for dynamically re-generating while also restricting its use for a given definition of time and event that is proposed for only. This also applies to the Pay-load Data as invoked by that dynamic ID that also wraps it appropriately (again this is an ALGO driven approach that ensures randomization). The dynamic ID is a Global ID Number or more specifically a Nomenclature (called GIN). The GIN is generated dynamically at each instance. The GIN is configured based on a plurality of parameters selected from a group consisting of an IP address or numbers assigned to an individual, personal information, retina-data as available in the records and are needed for certain types of validation like—e-Passport/e-VISA, criminal-acts, e-Voting, e-Presence qualifier depending on the case for remote interactions in future) finger print data, social security number of a given individual, a dynamic PIN as chosen by the User or it support agency who are the trusted entities for very critical transactions (money payment, order-booking, e-signatures for contracts etc.), location data (to avoid hackers from other parts of the world from intruding), any personal info of choice at any instant for a given transaction at that time etc. The GIN is generated and killed at the end of each transaction. No fixed pattern is used for generating the ID and data. The pattern is varied with respect to time and location. It is also configured by the user in terms of certain randomization methods that is inter-leaved within its generation technique.

According to an embodiment herein, the Payload Data Handling module is configured to protect actual information or transaction details or user data from hacking by containerizing or converting the data into data packets. The Payload Data Handling module is configured to provide data wrapping, segmenting and variable blocks that are combined randomly as determined by the ALGO. The pay load data is wrapped, segmented and grouped again to form blocks of modulated chains so that even if one packet is accessed by a hacker, the hacker is prevented from accessing rest of the packets and hacker is unable to identify/recognise/sense it either since the encryption and even the segments of Pay load Data that's contained within a given BLOCK and across blocks as part of say a flow-Chain (Flow-chains themselves are also dynamic and necessarily uses different routing modes and so sequencing them by intruder is out of question and is impossible). Thus Each data packet is wrapped in a container, which too is dynamically managed.

According to an embodiment herein, the Heuristic Network Management module is configured to invoke Adjunct Network Systems, and to provide Dynamic Routing, Variegated Flow Controls for Network Obfuscation to defeat the attacks by Hackers. The Heuristic Network Management module is configured to perform routing using water marked techniques over the network-path as it flows. It is also commanded by the Network Manager, along with an inherent obfuscation map tracker to leave no trail of the water-marked network-path. The heuristic network Management module is configured to invoke ADJUNCT N/w not only to provide resilience but also distributed armoured transfers, along with increased performance. The heuristic network Management module is configured to provide and also enforce multiple levels of Validation for Access Control thus using the Network Obfuscation map both as a Validator as well as a Gatekeeper to defeat the attacks or the Hackers at bay successfully. The heuristic network Management module is configured to provide Customized Controls and Validations to help the Clients meet the needs or requirements of users expecting different Safety levels. The User is enabled to opt for variety of controls and degree of safety with Intensity indexes that is suited to develop Complex GINs, Wrappers, Modulators and even Validators with Authorized External taking part in the management of its use. So, it is both dynamic and scale-able.

According to an embodiment herein, the Application Interface Manager is configured to provide safety by blocking out any unwanted access while validating actual transactions using Qualifiers (also called as Validators). The Application interface Manager is configured to work on a Dynamically Distributed Matrix Layered Spatially Organised Reference Index (DDMLSORI) model and transformation-engine. The Application interface Manager is provided with an application data engine and a context modeler comprising a layered database converter (data masking, meta-data-mapper, plenary-filter-analyzer) built around a validation cum control sequencer. The Application Interface Manager carries multi segmented filters. The filters dynamically picks or shares or drops encrypted pay load data from the flow-chains while also getting it ratified over the Network path to ensure that the packets arrived without disruption or the Safety-conduit is totally intact (not hacked) from origin to destination. Not all the time such transfers need to be necessarily Pay-load data or Info-exchange. It is also a just APP-functionality and not and even so the SAFETY-WARE Markers is able to extract the given shadow-functionality or a trigger a feature map with look-up table to decode a string of tasks/functions or event-tags that trigger a set of activities on the end server/application. A host of filters is still applied in a random order and is also inter-leaved to extract all pieces of information as dynamically decided by the algorithm to keep the protection still in play between the shadow systems and the end servers so that it is still be traced or disrupted by any intruder. Such extracts/ transfers is emanated from or linked to just one or more Interface systems that are also Governed by the Controller and SAFETYWARE Handlers to ensure that they are both dynamic and not repeated. A cluster of systems are dynamically decided/selected/identified and invoked by the algorithm. The Application interface Manager is further provided with a container algorithm for wrapping and packetizing data dynamically and randomly even for such localized exchanges and these are also not revealed to the external world to prevent an intrusion always.

According to an embodiment herein, the application interface manager is configured to use dynamic, time-based, multi factor elements that are embedded into both 1D and Data. Data security is ensured by mapping the data through a matrix to ensure an active protection through the entire cycle of transaction. The data is packed, wrapped and tokenized based on a time and also a representative event function marker (goes beyond Tags, Tokens—usually termed as Sequencers and actually uses a combination of Vendor supplied link-values, App-generated randomized event-strings, time-based-trigger within the stream to make it completely restricted in its recognition and use by any system or users accessing the Interface. The function also trigger composite element-matrix that are used to derive a common but random index specifically for a specified time and event that is explained/disclosed/described above for vendor supplied link values. The packed or tokenized data is interwoven with a user customized control so that the data is targeted and transmitted after wrapping with the user chosen validation elements. The decrypted information is available at no point in time to any hacker to take advantage of the since the original Pay Load Data or even the ID is now under the influence of multi-level wrappers, with matrixed segmentation that are distributed across the servers also dynamically so that there is no way to sew/stitch/integrate them together without the variety of controls that the Controllers and handlers are already imposed on these packets. Thus it exhibits a tight lock on what is exchanged from origin-point to end-point with no leakage en-route. The control mechanism is varied dynamically to provide a full safety encryption canvas that has a variety of ALGOs (algorithms) that works randomly and in a instantly derived combo to avoid repetitiveness (In other words no established pattern for the hacker to learn from). The application interface manager is configured to provide a plenary control over data flow, data storage, and data access and memory. The plenary control is dynamic, multi-segmented, and matrixed. No fixed pattern is employed in embedding and encrypting the data thereby preventing the hackers from extracting ingredients of e-Signature. The encryption pattern is varied dynamically and randomly with respect to time and location parameters. Thus, the system provides a security that is contiguous & matrix mapped to ensure an active protection throughout an entire life-cycle of transaction.

According to an embodiment herein, the Encapsulator module or Modulator or even the hardening module is configured to fortify the system resources, applications, databases, and exchange of information or messages with control mechanism. The Encapsulator module or Modulator or the hardening module is configured to provide a memory segmenting in encrypted form. This also means that the system (Servers, Hosts, Cloud-Clusters or Containers) is now variably/dynamically configured to ensure its own memory-Blocks/pages, Task-Managers within the respective Operating systems, the Drivers or system-call-Handlers, the Disks-Controllers, that are further SHIELDED in a manner that it has to be work under some operative controls that are determined dynamically by a set of Control Systems that Governs and manages/controls them across the Chain. This Model is like a CLOUD-Manager for CLOUD based Systems that orchestrates/conducts various functionalities within the hardware too. These solutions are developed using self-healing techniques to ensure no intruder is able to BLOCK or STOP it from functioning across the spectrum of control that is established over a set of servers and systems dedicated for the end functionality to be performed (be it E-MAIL servers or APP-Servers etc.). The Encapsulator module or hardening module is further provided with a multi-staged comparator which are part of a complex aggregation of algorithms and techniques similar to the DDML-SORI.

Furthermore, the system provides a Hardening or Encapsulation module for secured transfers and customized interface through bundled multi-level IP and variable masking-parameters.

According to one embodiment herein, the system provides multi-factor authorization with combinatory controls and validation tags. Further, the system provides an encryption algorithm that thrives on multiple parameters, segmented flags and markers for dynamic distribution of data. The system provides a variable schema for data with filters based on time and event indexes. Further, the system provides an intuitive wrapper and container for data by providing a multi-layered protection. The data is wrapped in a controlled access envelope with translation vectors. Also, the ID and data are inter-woven and churned through a randomizer engine. The interwoven data are transported through dynamic maps derived using reflective servers. The system provides for a multi staged validation and control mechanism for info transfers using dynamic mapping of data that rely on using reflective servers across the cloud/cluster heap.

According to one embodiment herein, the system provides a trigger and qualifier model for data and User Access Management. Further, the system provides a structured, secured and stratified application program interface with SAFETYWARE CONTROLS as already described/explained/disclosed above. The system provides application based Controllers for managing messaging operations and Database. The system allows for integrating Artificial intelligence elements into it, so as to enable analytics computation with improved speed and accuracy at a later point in time to also use the same for dynamic ALGO triggering and enhancing the dynamism of the computing engine as well.

These and other aspects of the embodiments herein will be better appreciated and understood when considered in conjunction with the following description and the accompanying drawings. It should be understood, however, that the following descriptions, while indicating the preferred embodiments and numerous specific details thereof, are given by way of an illustration and not of a limitation. Many changes and modifications may be made within the scope of the embodiments herein without departing from the spirit thereof, and the embodiments herein include all such modifications.

BRIEF DESCRIPTION OF THE DRAWINGS

The other objects, features and advantages will occur to those skilled in the art from the following description of the preferred embodiment and the accompanying drawings in which.

Figure 1:
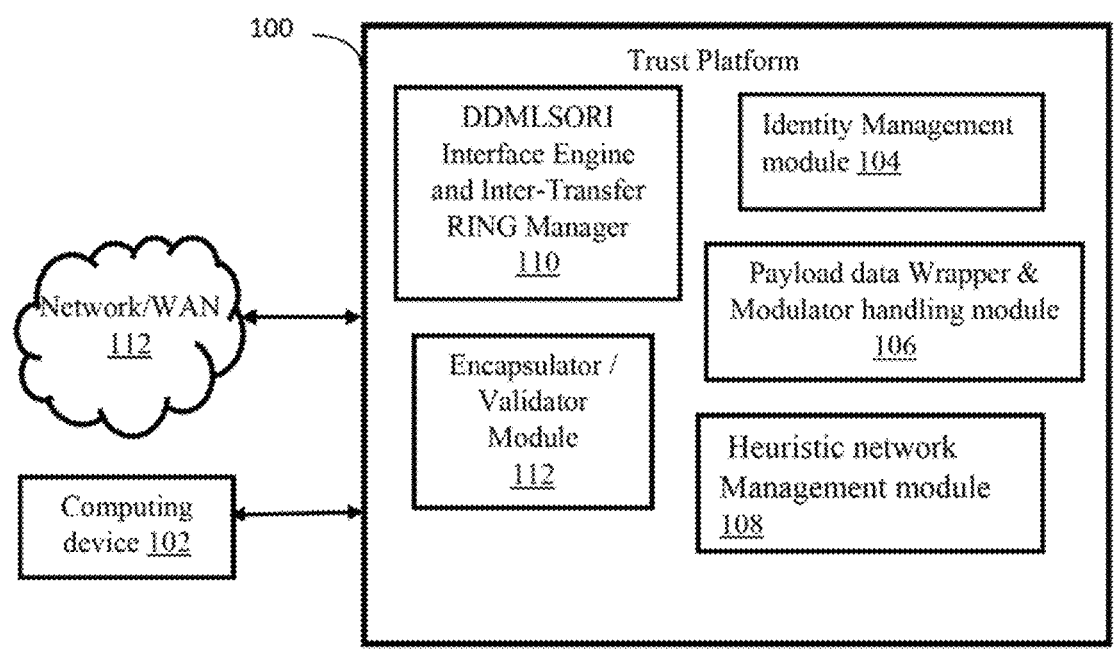
FIG. 1 illustrates a block diagram of a system for a multi-layered security control, according to an embodiment herein.

Although the specific features of the embodiment herein are shown in some drawings and not in others. This is done for convenience only as each feature may be combined with any or all of the other features in accordance with the embodiment herein.

DETAILED DESCRIPTION OF THE EMBODIMENTS HEREIN

In the following detailed description, a reference is made to the accompanying drawings that form a part hereof, and in which the specific embodiments that may be practiced is shown by way of illustration. These embodiments are described in sufficient detail to enable those skilled in the art to practice the embodiments and it is to be understood that the logical, mechanical and other changes may be made without departing from the scope of the embodiments. The following detailed description is therefore not to be taken in a limiting sense.

The various embodiments herein disclose an enhanced security mechanism for transactions with a multi-dimensional, multi-layered security controls. According to an embodiment herein, a system and method is provided to develop a robust platform for delivering end-to-end protection and safety for transactions along with spatially distributed data that are managed dynamically/remotely Ion-demand. According to an embodiment herein, a robust platform is developed to provide a complete SECURE-ZONE for Transactions. The robust platform is configured to manage the Flow-Control to provide an End-to-End security for the transactions, the pay load data and the spatially distributed data as described above or such elements that are part of or invoked on-demand at any given instant for transaction or inter-changes purposes. The robust platform is further configured to enable an Armoured Data Transfer across the data Chain by using an or a matrix of Adjunct network and uses Dynamic Routing Mechanisms. The robust platform is further configured to provide Variegated Control and Validation methods that improves the process of ensuring genuine transfers by several notches up;—thereby enabling total security for that transaction at any given instant. This mechanism also provides for an all-pervasive Controller functionality that enables and invokes the Internet of Things (IoT) elements so as to leverage an Intelligent Handlers that act as a shield-cum-protective cover, whenever the Systems or Applications or Users that are linked to such type of devices or an instrument or a sensor (that has limited intelligence or no intelligence but is part of a network) but is needed to function in unison to deliver additional security as opted to by the end User. The Platform provides extended safety cover for such elements that leverage these devices for data exchange and control purposes.

The various embodiments herein disclose an enhanced security mechanism for transactions by deploying a multi-dimensional, multi-layered security solution that incorporates new degree of Validation and Control thereby lifting/increasing the current Authentication & Authorization mechanism by two notches up. According to an embodiment herein, a system and method is provided to develop a robust platform for delivering end-to-end protection and safety for transactions with spatially distributed data using a multi-dimensional, multi-layered security Solution. According to an embodiment herein, a robust platform is planned to be developed to ensure/provide a complete secure-zone for Transactions. The robust platform is configured to manage the Flow-Control to provide an End-to-End security for the transactions, the pay load data and the spatially distributed data and applications that are used by Enterprises and User invoked Applications. The robust platform is further configured to enable an Armoured Data Transfer across the entire transaction-chain by using and/or a matrix of Adjunct network, and using Dynamic Routing Mechanisms as well as segmented and granulated data that needs to be validated and combined later to gain the full information—which happens only when the user-customized controls are applied in the authorised e-presence of the original user. The robust platform is further configured to provide a Variegated Control and Validation method that improves/increase as the process of ensuring genuine transfers by several notches up, thereby providing full protection for any given transaction at any given instant. The new Solution technique provides for an all-pervasive Controller function enabling the Internet of Things (IoT) elements using an Intelligent Handler at the point of Origination as well as destination—introducing such elements as a shield-cum-protective cover. This kind of additional control (with locational info, network-identifiers, Route-Map-Tags, Validation-Markers as developed and delivered at that instant by the Handlers and Controllers is configured to enforce and ensure that NO HACKER from other parts of the world invokes or reads or duplicates or repeats or copies these structured-flow-controlled ID, Pay-Load-data, Functionality-Index, Information-frame-watermarkers—thereby making it totally safe from hacking through a definitive conduit as managed by the network systems that ensures no trail or trace is allowed. The network management modeler is also configured to add the elements of control and splitting of the wrapped data-exchange primarily to ensure that no intruder comes in to way lay/access the information or even decipher the pattern or unravel the wrapper which the packets constantly undergo in terms of additional dynamic layering. Such layering is both composite and laced with validation parameters so that the access to data is refused or sniffed if the packet is even attempted to be disturbed in its dynamic path (which too is not something the intruder is able to actually find but it safeguards even against such unlikely events to make it fool-proof.

According to an embodiment herein, a system and method is provided with a SAFETYWARE web or mobile based application. The SAFETYWARE web or mobile based application is configured to provide a multi-layered platform with robust interface; a Device-Specific (OS) Communication Services Layer; a User-Specific Graphics and Data Management Wrappers; and a Device-Hardening module for Secured Transfers and Customized Interface. The system provides a comprehensive method of safeguarding the RESOURCES within the DEVICE or SYSTEM or even as spread across the NETWORK (LAN/WAN) or say a CLUSTER of SERVERS/EQUIPMENT/COMPUTING ELEMENTS that create SAFETY LAYERS and CONTROL AGENTS to manage as well as protect any designated transaction as invoked by a Genuine User/Application at any given instant. Such transactions are a result of an inherent functionality that is applicable as relevant to a given Application. The SAFETYWARE delivers Validation mechanisms that are applied to any User invoked or requested functionality of a given APP or the purpose of data exchange (say E-MAIL, Social networking tools etc.,) and thus ensure safety to such a command-flow by using synchronized controls. Thus the SAFETYWARE is a modeler and Controller for any APP or User commands that are now configured as the trigger for invoking any Transaction or info Exchange in a defined manner that is commonly applied or used today.

According to an embodiment herein, a security system and method is disclosed for providing a dynamic ID including personally identifiable elements of a given individual (referred to as GENUINE USER) apart from his/her biometric credentials and other inputs that are variably applied as when needed with time. The security system is enabled to handle Payload data and address the five vulnerable zones of attack such as Identity, User-data, Network, Interface and Application. The system and method provide a heuristic network management for network security. The system provides a means for a matrix mapped solution that contiguously applies its vectors, parameters, algorithms and system-modeler-configurators that ensures that the full protection is active throughout the entire chain. Also, the system provides a unique identifier (ID) or Global Identifier (GIN) unique ID or GIN for every individual that combines user ID with payload data. The system and method provides a solution which runs on a PLATFORM that invokes a mix of Protocols (and missing of such protocols is dynamically decided and instructed to be adhered to for a given transaction and/or data exchange) thereby ensuring that the intruder is both unaware and unable/does not comply with the demands of validation even when the transaction and data-exchange is in progress through the network.

According to an embodiment herein, the system and method provides a platform for multi-dimensional, multi-layered security solution. According to an embodiment herein, the system comprises an Identity Management module, a Payload Data handling module, a Heuristic Network Management module, an Application Interface Manager, and a System Encapsulator module or System Hardening module.

According to an embodiment herein, the Identity Management module is configured to safeguard passwords, PINS, user information, and device data. The identity management module is configured to provide a dynamic ID that is time-based and configured based on multi factor elements that user has the choice (several options to invoke dynamically—even though how they are combined is left to the system and it's computing model-engine) to customize at various points. The time-based, dynamic ID configured with multi factor elements are used to embed both ID and data. The identity management module is provided with a reconstruction algorithm called Validation & Control mechanisms an innovation that provides for a tremendous advancement over the existing Authorization & Authentication models that are restrictive in nature for its functioning. Hence there's a critical need for incorporating new models and methods to address today's limitations by pushing for a more advanced and deeply structured method for dynamically re-generating while also restricting its use for a given definition of time and event that is proposed for only. This also applies to the Pay-load Data as invoked by that dynamic ID that also wraps it appropriately (again this is an ALGO driven approach that ensures randomization). The dynamic ID is a Global ID Number or more specifically a Nomenclature (called GIN). The GIN is generated dynamically at each instance. The GIN is configured based on a plurality of parameters selected from a group consisting of an IP address or numbers assigned to an individual, personal information, retina-data as available in the records and are needed for certain types of validation like—e-Passport/e-VISA, criminal-acts, e-Voting, e-Presence qualifier depending on the case for remote interactions in future) finger print data, social security number of a given individual, a dynamic PIN as chosen by the User or it support agency who are the trusted entities for very critical transactions (money payment, order-booking, e-signatures for contracts etc.), location data (to avoid hackers from other parts of the world from intruding), any personal info of choice at any instant for a given transaction at that time etc. The GIN is generated and killed at the end of each transaction. No fixed pattern is used for generating the ID and data. The pattern is varied with respect to time and location. It is also configured by the user in terms of certain randomization methods that is inter-leaved within its generation technique.

According to an embodiment herein, the Payload Data Handling module is configured to protect actual information or transaction details or user data from hacking by containerizing or converting the data into data packets. The Payload Data Handling module is configured to provide data wrapping, segmenting and variable blocks that are combined randomly as determined by the ALGO. The pay load data is wrapped, segmented and grouped again to form blocks of modulated chains so that even if one packet is accessed by a hacker, the hacker is prevented from accessing rest of the packets and backer is unable to identify/recognise/sense it either since the encryption and even the segments of Pay load Data that's contained within a given BLOCK and across blocks as part of say a flow-Chain (Flow-chains themselves are also dynamic and necessarily uses different routing modes and so sequencing them by intruder is out of question and is impossible). Thus, each data packet is wrapped in a container, which too is dynamically managed.

According to an embodiment herein, the Heuristic Network Management module is configured to invoke Adjunct Network Systems, and to provide Dynamic Routing, Variegated Flow Controls for Network Obfuscation to defeat the attacks by Hackers. The Heuristic Network Management module is configured to perform routing using water marked techniques over the network-path as it flows. It is also commanded by the Network Manager, along with an inherent obfuscation map tracker to leave no trail of the watermarked network-path. The heuristic network Management module is configured to invoke ADJUNCT N/w not only to provide resilience but also distributed armoured transfers, along with increased performance. The heuristic network Management module is configured to provide and also enforce multiple levels of Validation for Access Control thus using the Network Obfuscation map both as a Validator as well as a Gatekeeper to defeat the attacks or the Hackers at bay successfully. The heuristic network Management module is configured to provide Customized Controls and Validations to help the Clients meet the needs or requirements of users expecting different Safety levels. The User is enabled to opt for variety of controls and degree of safety with Intensity indexes that is suited to develop Complex GINs, Wrappers, Modulators and even Validators with Authorized External taking part in the management of its use. So, it is both dynamic and scale-able.

According to an embodiment herein, the Application Interface Manager is configured to provide safety by blocking out any unwanted access while validating actual transactions using Qualifiers (also called as Validators). The Application interface Manager is configured to work on a Dynamically Distributed Matrix Layered Spatially Organised Reference Index (DDMLSORI) model and transformation-engine. The Application interface Manager is provided with an application data engine and a context modeler comprising a layered database converter (data masking, meta-data-mapper, plenary-filter-analyzer) built around a validation cum control sequencer. The Application Interface Manager carries multi segmented filters. The filters dynamically pick or share or drop the encrypted pay load data from the flow-chains while also getting it ratified over the Network path to ensure that the packets arrived without disruption or the Safety-conduit is totally intact (not backed) from origin to destination. Not all the time such transfers need to be necessarily Pay-load data or Info-exchange. It is also a just APP-functionality and not and even so the SAFETY-WARE Markers is able to extract the given shadow-functionality or a trigger a feature map with look-up table to decode a string of tasks/functions or event-tags that trigger a set of activities on the end server/application. A host of filters is still applied in a random order and is also interleaved to extract all pieces of information as dynamically decided by the algorithm to keep the protection still in play between the shadow systems and the end servers so that it is still be traced or disrupted by any intruder. Such extracts/transfers is emanated from or linked to just one or more Interface systems that are also Governed by the Controller and SAFETYWARE Handlers to ensure that they are both dynamic and not repeated. A cluster of systems are dynamically decided/selected/identified and invoked by the algorithm. The Application interface Manager is further provided with a container algorithm for wrapping and packetizing data dynamically and randomly even for such localized exchanges and these are also not revealed to the external world to prevent an intrusion always.

According to an embodiment herein, the application interface manager is configured to use dynamic, time-based, multi factor elements that are embedded into both ID and Data. Data security is ensured by mapping the data through a matrix to ensure an active protection through the entire cycle of transaction. The data is packed, wrapped and tokenized based on a time and also a representative event function marker (goes beyond Tags, Tokens—usually termed as Sequencers and actually uses a combination of Vendor supplied link-values, App-generated randomized event-strings, time-based-trigger within the stream to make it completely restricted in its recognition and use by any system or users accessing the Interface. The function also triggers composite element-matrix that are used to derive a common but random index specifically for a specified time and event that is explained/disclosed/described above for vendor supplied link values. The packed or tokenized data is interwoven with a user customized control so that the data is targeted and transmitted after wrapping with the user chosen validation elements. The decrypted information is available at no point in time to any hacker to take advantage of the since the original Pay Load Data or even the ID is now under the influence of multi-level wrappers, with matrixed segmentation that are distributed across the servers also dynamically so that there is no way to sew/stitch/integrate them together without the variety of controls that the Controllers and handlers are already imposed on these packets. Thus, it exhibits a tight lock on what is exchanged from origin-point to end-point with no leakage en-route. The control mechanism is varied dynamically to provide a full safety encryption canvas that has a variety of ALGOs (algorithms) that works randomly and in a instantly derived combo to avoid repetitiveness (In other words no established pattern for the hacker to learn from). The application interface manager is configured to provide a plenary control over data flow, data storage, and data access and memory. The plenary control is dynamic, multi-segmented, and matrixed. No fixed pattern is employed in embedding and encrypting the data thereby preventing the hackers from extracting ingredients of e-Signature. The encryption pattern is varied dynamically and randomly with respect to time and location parameters. Thus, the system provides a security that is contiguous & matrix mapped to ensure an active protection throughout an entire life-cycle of transaction.

According to an embodiment herein, the Encapsulator module or Modulator or even the hardening module is configured to fortify the system resources, applications, databases, and exchange of information or messages with control mechanism. The Encapsulator module or Modulator or the hardening module is configured to provide a memory segmenting in encrypted form. This also means that the system (Servers, Hosts, Cloud-Clusters or Containers) is now variably/dynamically configured to ensure its own memory-Blocks/pages, Task-Managers within the respective Operating systems, the Drivers or system-call-Handlers, the Disks-Controllers, that are further SHIELDED in a manner that it has to be work under some operative controls that are determined dynamically by a set of Control Systems that Governs and manages/controls them across the Chain. This Model is like a CLOUD-Manager for CLOUD based Systems that orchestrates/conducts various functionalities within the hardware too. These solutions are developed using self-healing techniques to ensure no intruder is able to BLOCK or STOP it from functioning across the spectrum of control that is established over a set of servers and systems dedicated for the end functionality to be performed (be it E-MAIL servers or APP-Servers etc.). The Encapsulator module or hardening module is further provided with a multi-staged comparator which are pan of a complex aggregation of algorithms and techniques like the DDMLSORI.

Furthermore, the system provides a Hardening or Encapsulation module for secured transfers and customized interface through bundled multi-level IP and variable masking-parameters.

According to one embodiment herein, the system provides multi-factor authorization with combinatory controls and validation tags. Further, the system provides an encryption algorithm that thrives on multiple parameters, segmented flags and markers for dynamic distribution of data. The system provides a variable schema for data with filters based on time and event indexes. Further, the system provides an intuitive wrapper and container for data by providing a multi-layered protection. The data is wrapped in a controlled access envelope with translation vectors. Also, the ID and data are inter-woven and churned through a randomizer engine. The interwoven data are transported through dynamic maps derived using reflective servers. The system provides for a multi staged validation and control mechanism for info transfers using dynamic mapping of data that rely on using reflective servers across the cloud/cluster heap.

According to one embodiment herein, the system provides a trigger and qualifier model for data and User Access Management. Further, the system provides a structured, secured and stratified application program interface with SAFETYWARE CONTROLS as already described/explained/disclosed above. The system provides application-based Controllers for managing messaging operations and Database. The system allows for integrating Artificial intelligence elements into it, to enable analytics computation with improved speed and accuracy at a later point in time to also use the same for dynamic ALGO triggering and enhancing the dynamism of the computing engine as well.

According to an embodiment herein, a system and method is provided with a SAFETYWARE web or mobile based application. The SAFETYWARE web or mobile based application is configured to provide a multi-layered platform with robust interface; a Device-Specific (OS) Communication Services Layer; a User-Specific Graphics and Data Management Wrappers; and a Device-Hardening module for Secured Transfers and Customized Interface. The system provides a comprehensive method by creating and deploying SAFETY LAYERS and CONTROL AGENTS to manage as well as ensure protection during a transaction that's invoked by a Genuine User/Application at any given instant—such initiation being a result of a functionality that's relevant to that Application (termed as Shadow functionality with limited scope) or just a mere access to such elements with or without an application but with some software that enables inter-change or even allows for simple access to it.

According to an embodiment herein, a security system and method is disclosed for providing a dynamic ID including personally identifiable elements of a given individual or DEVICE (referred to as GENUINE USER/ELEMENT) apart from his/her biometric credentials and other inputs that can be variably applied as & when needed with time. The security system is enabled to handle payload data and addresses all the five vulnerable zones of attack such as Identity, user data, network, interface and application. The system and method provides a heuristic network management for network security. The system provides a means for a contiguous and matrix mapped solution to ensure that the protection is active through the entire cycle. Also, the system provides a unique identifier (ID) or Global Identifier (GIN) unique ID or GIN for every individual that combines user ID with payload data. The system and method provides a solution runs on a PLATFORM that invokes a mix of Protocols (and missing of such protocols being dynamically decided and instructed to be adhered to for a given transaction and/or data exchange)—ensuring intruder is both unaware and cannot comply with the demands of validation even when the transaction and data-exchange is in progress through the network. According to an embodiment herein, the system and method provides a platform for multi-dimensional, multi-layered security control. According to an embodiment herein, the system comprises an Identity Management module, a Payload Data handling module, a Heuristic Network Management module, an Application Interface Manager, and a System Encapsulator or Modulator module, Randomized Validator and/or Hardening module.

According to an embodiment herein, the Identity Management module is configured to safeguard passwords, PINS, user information, and device data. The identity management module is configured to provide a dynamic ID that is time-based and configured based on multi factor elements that user has the choice to customize at various points. The time-based, dynamic ID, configured with multi factor elements are used to embed both ID and data. The identity management module is provided with a reconstruction algorithm called Validation & Control mechanism—a clear advancement of not limiting to Authorization & Authentication process that exists today and so this ensures a deeply structured method for Dynamically re-generating and Protecting ID and data that varies by instance. The dynamic ID is a Global ID or Nomenclature and is termed as GIN. The GIN is generated dynamically at each instance. The GIN is configured based on a plurality of parameters selected from a group consisting of an IP address or numbers assigned to an individual, personal information details, retina-data as available in the records and as might be needed for certain types of validation like—e-Passport/e-VISA, criminal-acts, e-Voting, e-Presence qualifier as might be the case for remote interactions in future) finger print data, social security number of a given individual, a dynamic PIN as chosen by the User or it support agency who are the trusted entities for very critical transactions (money payment, order-booking, e-signatures for contracts etc.), location data (to avoid hackers from other parts of the world from intruding), any use of any personal info of user's choice at that instant for a given transaction at that time is also an added edge from a security angle. The GIN is generated and killed at the end of each transaction. No fixed pattern is used for generating the ID and data. The pattern is varied with respect to time and location and is not repeated to ensure safety.

According to an embodiment herein, the Payload Data Handling module is configured to protect actual information or transaction details or user data from hacking by containerizing or converting the data into data packets. The Payload Data Handling module is configured to provide data wrapping, segmenting and variable blocks of data and also dynamically chaining them. The pay load data is wrapped, segmented and grouped again to form blocks of configurable chains so that even if one packet is accessed by a hacker, the hacker is prevented from accessing the rest of the packets and hacker cannot make much sense of the information contained within that packet either. Each data packet is wrapped in a variably structured container.

According to an embodiment herein, the Heuristic Network Management module is configured to invoke Adjunct Network Systems, and to provide Dynamic Routing, Variegated Flow Controls for Network Obfuscation to defeat the attacks by Hackers. The Heuristic Network Management module is configured to perform routing using water marked techniques over the network as it flows through networking elements and the same is commanded by the Network Manager/Controller/Handler for protective-cover. Such an obfuscation model uses a relational map tracking technique. This technique is built using filtered trigger tags and indexes that masks the sequence-tabs, but keeps its intelligence for proper flow management specific to that transaction only also its uses flags of relational path with water-marks; so as to ensure definitive end-to-end delivery as demanded and purposed for that transaction by the Genuine user. Suche-watermarking across a network topology is vital for performance as well safety as ensures no trail is left behind after the completion of that transaction and also no intruder can interject or claim to have traversed a path by adjusting some routing parameters. That can be easily caught and so the intruder is more visible and be trapped even more easily than is possible with today's technology, where-in the intruder can hide himself/herself and also masquerade as the Genuine User. This results in the heuristic network Management module being configured to invoke ADJUNCT N/w that delivers resilience, armoured transfers, and increased performance. The heuristic network Management module is configured to provide and enforce multiple levels of Access Control combined with Network Obfuscation to defeat the attacks of the Hackers successfully. The heuristic network Management module is configured to provide Customized Controls & Validations to help Clients to meet the needs or requirements for different Safety levels as demanded.

According to an embodiment herein, the Application Interface Manager is configured to provide safety by blocking out any unwanted access while validating actual transactions using Qualifiers (also called as Validators). The Application interface Manager is configured to work on a Dynamically Distributed Matrix Layered Spatially Organised Reference Index (DDMLSORI) platform. The Application interface Manager is provided with an application data engine comprising of a layered database converter, and a validation cum control sequencer. The Application Interface Manager carries multi segmented filters. The filters dynamically pick or share or drop actually encrypted pay load data from the blocks of chain that got transmitted over the network or it could reveal a more indirect functionality which is hidden within the block or link to a feature as mapped within the block and the resultant application at the end server/application so as to invoke or respond to the same in a stealth manner. This would mean no user or the Administrator can figure out what's going in within the application at that given instant when the Genuine user has invoked a transaction that now interacts with the destination servers/systems that participate in the transaction as its fulfillment process. The filters may be applied in a random order and could also be inter-leaved to extract all pieces of information as dynamically decoded by the algorithm. Such extracts/transfers could emanate from or even be linked to just one Interface system or a cluster of systems solely to ensure dynamic decoding as purposed for by the randomized algorithm. The Application interface Manager is further provided with a container algorithm for wrapping and packetizing data dynamically and randomly for all exchanges that are still part of the transaction to retain its SAFETY cover at all times until the transaction is completed or dies.

According to an embodiment herein, the application interface manager is configured to use dynamic, time-based, multi factor elements to embed both ID & data. Data security is ensured by mapping the data through a matrix to ensure an active protection through an entire cycle of transaction. The data is packetized, wrapped and tokenized based on a time and also a representative event function which could also be a combination of functionality that the User/Application is invoking. The function of many trigger elements that are used to derive a common but random index for that time and event mix. The packeted or tokenized data is interwoven with a user customized control so that the data is targeted and transmitted after wrapping with the user chosen/opted/configured validation elements. The decrypted information is available at no point in time for any hacker to take advantage of the original Pay Load Data or ID for that matter. The control mechanism is varied dynamically to provide a full safety encryption canvas. The application interface manager is configured to provide a plenary control over data flow, data storage, and data access and display. The plenary control is dynamic, multi-segmented, and matrixed. No fixed pattern is employed in embedding and encrypting the data thus preventing the hackers from even attempting to extract its ingredients since the user's e-Signature encrypts and wraps it and attempting to successfully decode such dynamic wrapper isn't feasible by any means. The Algorithm has self-destruct process flags that would ensure Data implodes—meaning gets corrupted should it sense any wrong attempt to access it by Hackers. The encryption pattern is varied dynamically and randomly with respect to time and location parameters. Thus, the system provides a security that is contiguous & matrix mapped to ensure an active protection through an entire cycle of transaction.

According to an embodiment herein, the Encapsulator module or hardening module is configured to fortify the system resources, applications, databases, and exchange of message with control mechanism. The Encapsulator module or hardening module is configured to provide a memory segmenting even in encrypted form within the memory or disks that are part of the Interface Systems or Application Server whether in isolation or in a cluster for such Data or Info that's relevant to that Transaction or Application. This will ensure that even the Application or the database in standalone will not reveal any of its contents so loosely for any abuse because its wrapped and encrypted and so would necessarily need the intelligence and Services of the Security layered Algorithm to interface or decode or extract it—which action will only be performed as per Transaction flow characteristics that governs the application as a whole. The Encapsulator module or hardening module is further provided with a multi-staged comparator following the techniques similar to the DDMLSORI.

The embodiments herein disclose a multi-layered platform with robust interface comprising a Device-Specific (OS) Communication Services Layer. Further, the system is configured to provide user-specific graphics with Data Management Wrappers for wrapping the data. Furthermore, the system provides a Hardening or Encapsulation module for secured transfers and customized interface through bundled multi-level IP masking and Device address locking protocol that uses technique of indirection and alternative addressing schema to make it a variable parameter even in a defined IP world.

According to one embodiment herein, the system provides multi-factor authorization with combinatory controls and validation tags. Further, the system provides an encryption algorithm that thrives on multiple parameters, segmented flags and markers for dynamic distribution of data. The system provides a variable schema for data with filters based on time and event indexes. Further, the system provides an intuitive wrapper and container for data by providing a multi-layered protection. The data is wrapped in a controlled access envelope with translation vectors. Also, the ID and data are inter-woven and churned through a randomizer engine. The interwoven data are transported through dynamic maps derived using reflective servers. The system provides a multi staged validation and controls for the data using dynamic mapping of data using reflective servers.

According to one embodiment herein, the system provides a trigger and qualifier model for data and User Access Management. Further, the system provides a structured, secured and stratified application program interface (S3 API). The system provides application based Controllers for managing messaging operations and Database. The system allows for integrating Artificial intelligence elements into it to perform analytics with improved speed and accuracy at a later point in time.

FIG. 1 illustrates a block diagram of a system 100 for multi-dimensional, multi-layered security control with distributed drivers and controllers to lift authentication and authorization to ensure end-to-end protection for transactions in which aspects of the invention may be employed. The system 100 provides intuitively deployed algorithms for safety and security. The system provides a security platform, for example Trust that provides for dynamically and heuristically managed security across all zones of vulnerability including ID, data, network, interface, systems/servers/cloud-clusters.

The System 100 includes a computing device 102 associated with user. The system includes the Identity management module 104, Payload data handling module 106, Heuristic Network Management module 108, Application interface Manager 110, and an encapsulator module 112.

The identity management module 104 is configured to safeguard passwords, PINS, user information, and device data. The identity management module 104 is configured to provide a dynamic ID, time-based, multi factor elements that is used to embed both ID and data. The dynamic ID includes the biometric credentials of a user such as finger print, retina scan and the like.

According to an embodiment herein, the Identity Management module 104 is configured to safeguard passwords, PINS, user information, and device data. The identity management module is configured to provide a dynamic ID that is time-based and configured based on multi factor elements. The time-based, dynamic ID, configured with multi factor elements are used to embed both ID and data. The identity management module is provided with a reconstruction algorithm for generating ID and data. The dynamic ID is a Global ID or Nomenclature (GIN). The GIN is generated dynamically at each instance. The GIN is configured based on a plurality of parameters selected from a group consisting of an IP address or numbers assigned to an individual, personal information, retina data, finger print data, social security number of individual, PIN, location data, etc. The GIN is generated and killed at the end of each transaction. No fixed pattern is used for generating the ID and data. The pattern is varied with respect to time and location.

According to an embodiment herein, the Payload Data Handling module 106 is configured to protect actual information or transaction details or user data from hacking by containerizing or converting the data into data packets. The Payload Data Handling module 106 is configured to provide data wrapping, segmenting and block chain. The pay load data is wrapped, segmented and grouped again to form a block of chains so that even one packet is accessed by a hacker, the hacker is prevented from accessing rest of the packets. Each data packet is wrapped in a container.

According to an embodiment herein, the Heuristic Network Management module 108 is configured to invoke Adjunct Network Systems, and to provide Dynamic Routing, Variegated Flow Controls for Network Obfuscation to defeat the attacks by Hackers. The Heuristic Network Management module 108 is configured to perform routing of water marked networks, and obfuscation map tracker for the watermarked networks. The Heuristic Network Management module 108 is configured to invoke ADJUNCT (supplementary) N/w to provide resilience, armoured transfers, and increased performance. The Heuristic Network Management module 108 is configured to provide and enforce 4 Levels of Access Control combined with Network Obfuscation to defeat the attacks of the Hackers successfully. The Heuristic Network Management module 108 is configured to provide Customized Controls & Validations to help Clients to meet the needs or requirements for different Safety levels.

According to an embodiment herein, the Application interface Manager 110 is configured to provide safety by blocking out any unwanted access while validating actual transactions using Qualifiers. The Application interface Manager is configured to work on a Dynamically Distributed Matrix Layered Spatially Organised Reference Index (DDMLSORI) platform. The Application interface Manager is provided with an application data engine comprising a layered database converter, and a validation cum control sequencer. The Application interface Manager is further provided with a container algorithm for wrapping and packeting data dynamically and randomly.

According to an embodiment herein, the Encapsulator module or hardening module 112 is configured to fortify the system resources, applications, databases, and exchange of message with control mechanism. The Encapsulator module or hardening module is configured to provide a memory segmenting, and walling schema for data. The Encapsulator module or hardening module is further provided with a multi-staged comparator.

The system provides a secure zone for transactions enabling management of Flow-Control to provide armoured data transfer across the chain and drives adjunct network using dynamic routing mechanism and variegated IOT handler that leverages devices. The embodiments herein disclose a multi-layered platform with robust interface comprising a Device-Specific (OS) Communication Services Layer, User-Specific Graphics and Data Management Wrappers and Device-Hardening or Encapsulation module for secured transfers and customized interface.

According to one embodiment herein, the method further comprises invoking ADJUNCT network to provide resilience, armoured transfers, increased performance. Further, the method provides four levels of access control combined with network obfuscation to prevent hacking. The Customized Controls and validations to help clients to tune their needs for varied safety levels.

According to one embodiment herein, the computing device 102 communicate with one another by way of communication network 114, which may include an intranet, the Internet, a local area network (LAN), a wide area network (WAN), a public switched telephone network (PSTN), a cellular network, a voice over internet protocol (VoIP) network, and the like, for example. Device may be a wired or wireless phone, a computer, a facsimile machine, a personal digital assistant (PDA), and the like, for example. Furthermore, the device may not be associated with user 116 but may instead be a public computer, for example, which may be accessed by various consumers at a cyber store.

According to an embodiment herein, the user attempts to complete a transaction using the device over the network with security controls for complete protection. A transaction is performed online over communication network 114. For a virtual or online transaction, device is employed by user. Examples of the transaction process includes payment, in which user is required to provide credit card, debit card, check, and/or electronic-check (e-check) information.

According to an embodiment herein, the system is implemented to provide security in a plurality of domains including but not limited to health care, Banking, MFG. Further, the system can be integrated into a plurality of platforms including telecom players, internet service provider, and SCADA/DAS solution for Industrial IoT. The system is also implemented for security control in email management, and business applications.

The embodiments herein disclose a multi-layered platform with robust interface comprising a Device-Specific (OS) Communication Services Layer. Further, the system is configured to provide user-specific graphics with Data Management Wrappers for wrapping the data. Furthermore, the system provides a Hardening or Encapsulation module for secured transfers and customized interface through bundled multi-level IP masking.

According to one embodiment herein, the system provides multi-factor authorization with combinatory controls and validation tags. Further, the system provides an encryption algorithm that thrives on multiple parameters, segmented flags and markers for dynamic distribution of data. The system provides a variable schema for data with filters based on time and event indexes. Further, the system provides an intuitive wrapper and container for data by providing a multi-layered protection. The data is wrapped in a controlled access envelope with translation vectors. Also, the ID and data are inter-woven and churned through a randomizer engine. The interwoven data are transported through dynamic maps derived using reflective servers. The system provides a multi staged validation and controls for the data using dynamic mapping of data using reflective servers.

According to one embodiment herein, the system provides a trigger and qualifier model for data and User Access Management. Further, the system provides a structured, secured and stratified application program interface (S3 API). The system provides application based Controllers for managing messaging operations and Database. The system is further integrated with Artificial intelligence to perform analytics with improved speed and accuracy.

Figure 2A:
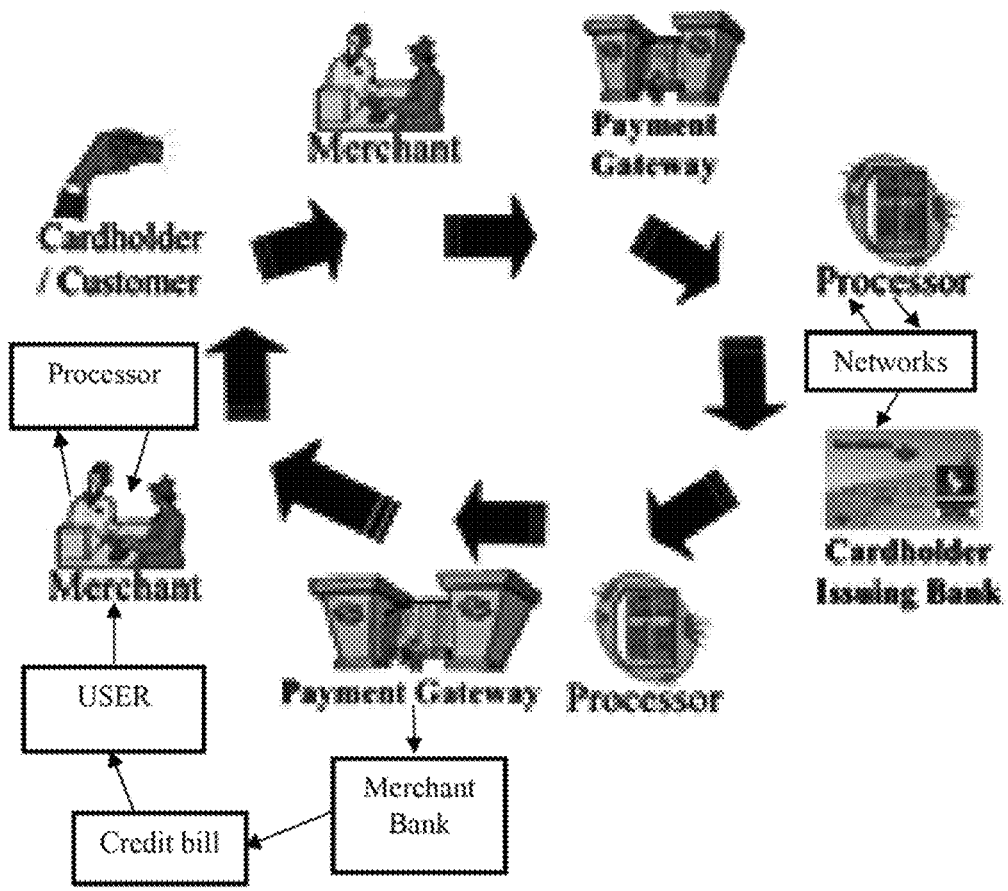
FIG. 2A illustrates a functional block diagram explaining an implementation of the system in banking process, according to an embodiment herein.

FIG. 2A illustrates an exemplary implementation of the system in banking transaction flow. To initiate a transaction, the user ID needs to be real-time with multi-factor elements such as biometric, voice tags, geometric location, passwords, and the like. Further, the user ID is dynamically split across multiple networks from the merchant. The processor is configured to perform processing of cluster of data received from genuine user over multiple network with real-time elements for validation and controls. The data including user ID is obfuscated to prevent hacking. The obfuscated data is sent over the network by masquerading IP by variegated and multifarious network architecture. The data is sent across the merchant bank through the application interface. The application interface provides multi-level matrix of data structures with validation tags that cannot be read or used by a hacker. Thereafter, a credit card bill is generated for the transaction by the card issuing bank. Thus, the transaction system and applications are safe-guarded by protecting resources using a robust algorithm and driver.

Figure 2B:
FIG. 2B illustrates a functional block diagram of the system implemented in a banking process indicating the points to be protected, according to an embodiment herein.

FIG. 2B illustrates an example of a stealth/breach in banking transaction. The main issues occurring in identity management are stealing users account, card, PIN, CVV, stealing credentials using stolen card or duplicating card. Further payload data management points include extracting user data for copying, abusing, and faking user transactions. In the network management zone, hackers set honey traps for pattern recognition, deflection, and denying access. Further, application access management issues include memory and database exhilaration, and messaging an open channel for data corruption.

Figure 3A:
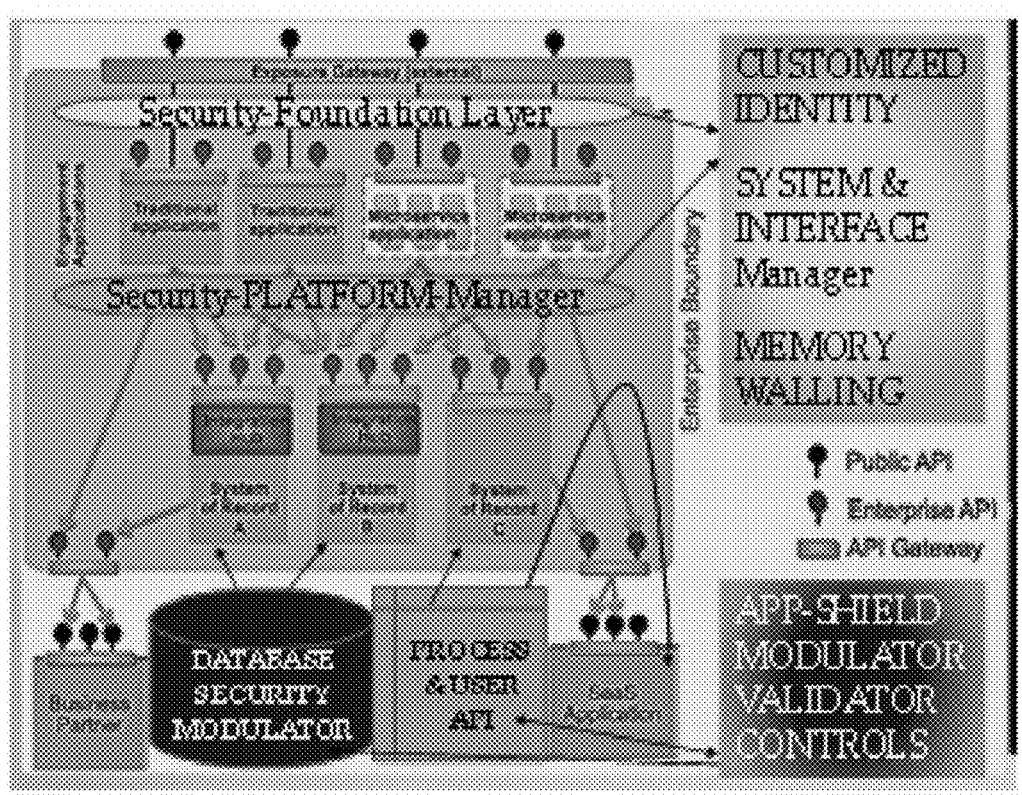
FIG. 3A illustrates a block diagram of a multi-layered security system implemented in an internal system in an enterprise, according to an embodiment herein

FIG. 3A illustrates an example of the inside view of the multi-layered security system with TRUST platform implemented in an enterprise. FIG. 3A depicts internal flow mechanisms, control sequences, management processes are just an illustration of its depth and wide-spread nature of its structure and it's functional characteristics. The security system provides customised identity, system interface manager and memory walling at the enterprise boundary. Further, the system provides validator controls at an application program interface.

Figure 3B:
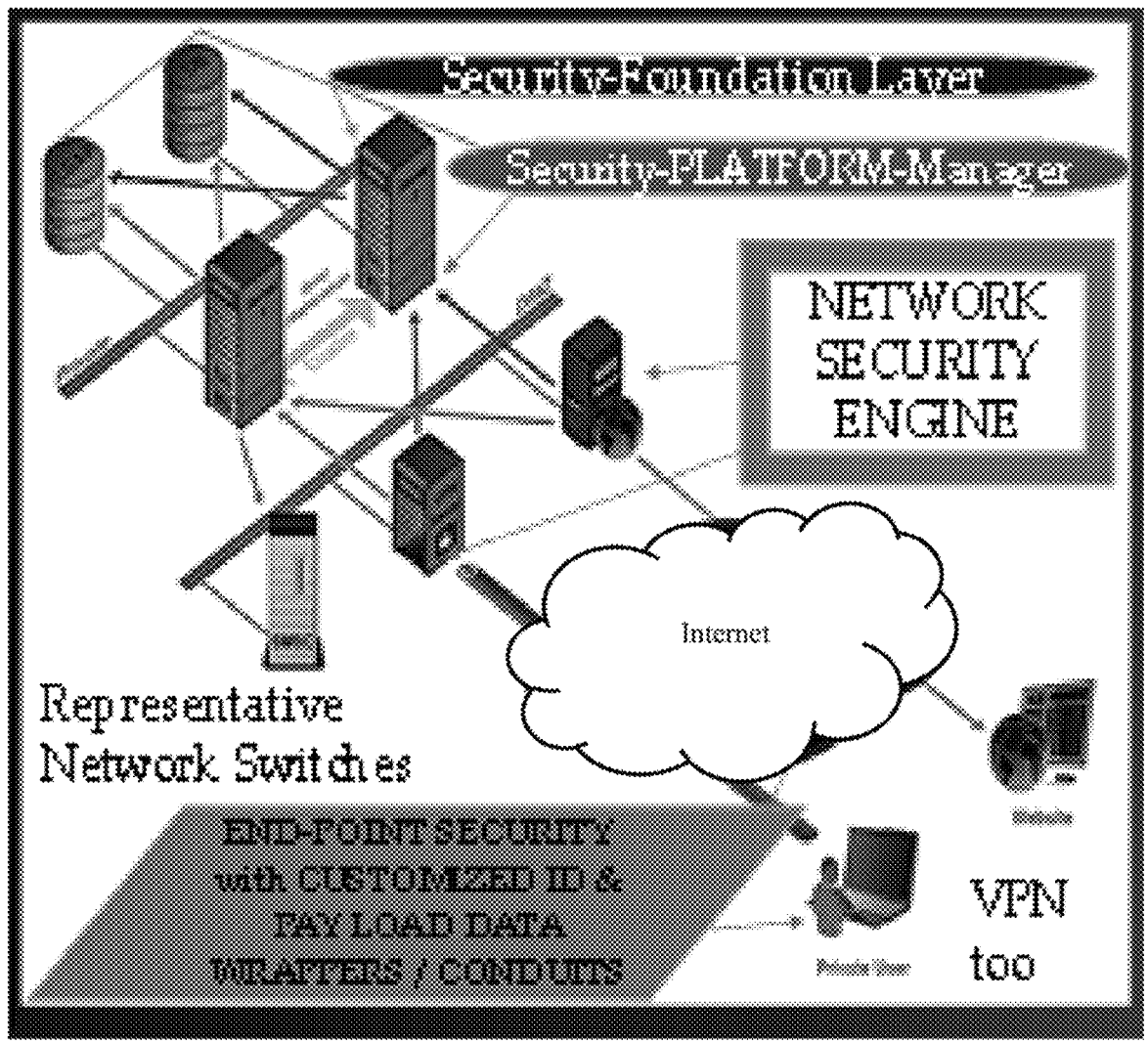
FIG. 3B illustrates a block diagram of the multi-layered security system that is implemented in an external system to an enterprise, according to an embodiment herein

FIG. 3B illustrates an example of the deployment considerations and layering schema of the multi-layered security system that is implemented in an enterprise. FIG. 3B depicts the deployment and implementation schema are just a simple illustration of its seamlessly and intuitively integrated mechanism of its engine, its controllers, interface managers, configurations.

Figure 4:
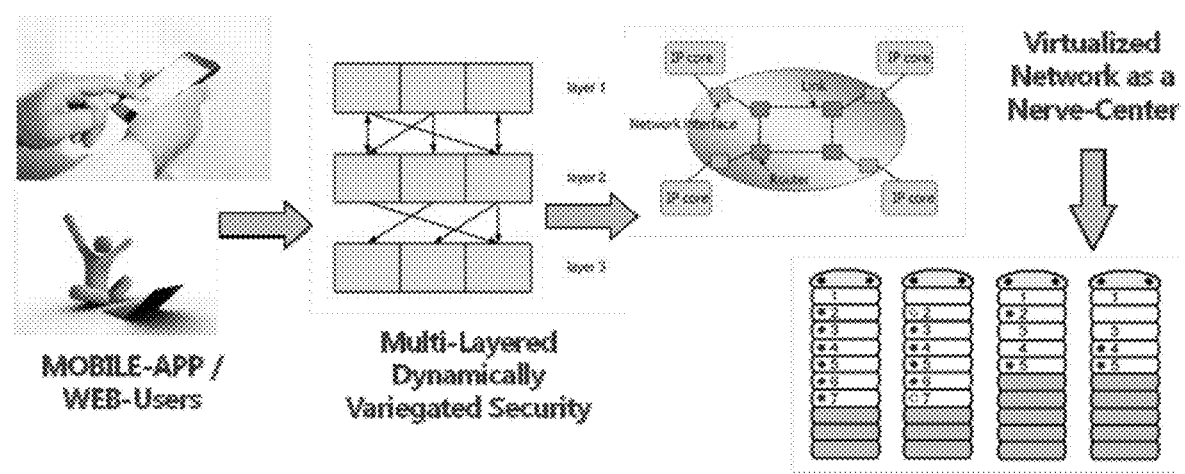
FIG. 4 illustrates a functional block diagram of an intuitive enterprise system comprising the enterprise application with DDMLSORI, and intuitive interface, according to an embodiment herein.

FIG. 4 illustrates a multi-layered and distributed sketch of trust (technologically re-engineered unique security for transactions) platform that demonstrates as to bow end-to-end safety & protection is provided. The platform consists of multitudes of Components and Variably segmented computing Algorithms that operate Dynamically and in a Matrixed manner to ensure it cannot be copied and repeated. Variegated Plenary Modular flow mechanisms that Trigger, Manage, Validate, Modulate, Track, Govern, Dynamically-Invoke, Transform Parameters (Control, Transactional details, Operational Elements) into a Combinatorial Model of Packetized Info for inter-change is the edge that our trust platform and safetyware solutions carry/built-with.

Figure 5:
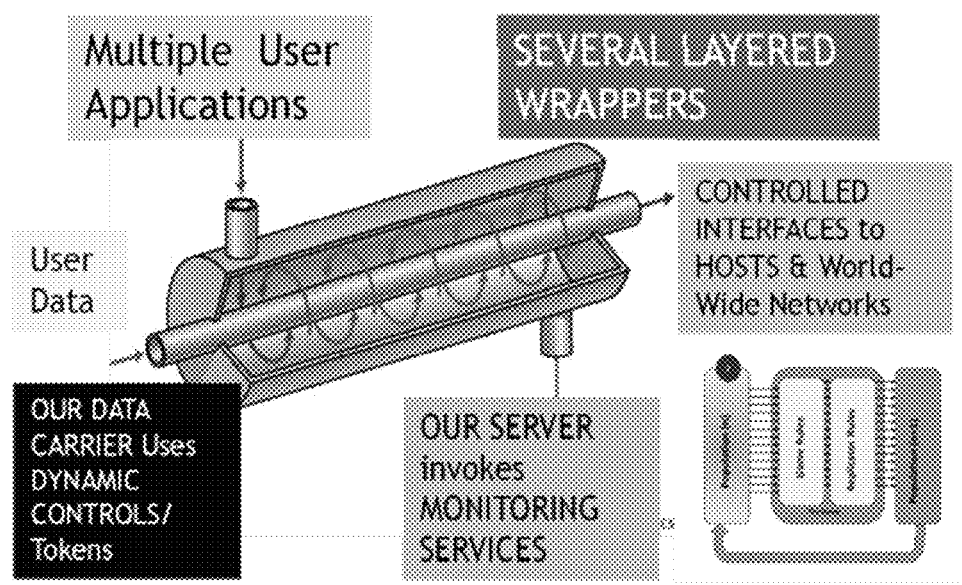
FIG. 5 illustrates a functional block diagram of a flow-control system embedded with wrappers & containers that drives safety across the entire chain using conduit framework structure, according to an embodiment herein.

FIG. 5 illustrates a model of flow-control system embedded with wrappers & containers that drives safety across the entire chain using conduit framework structure. The system invokes mechanisms that leverage the power of dynamic and randomized exchange protocol to beat hackers in their own game and protect transfers.

Figure 6:
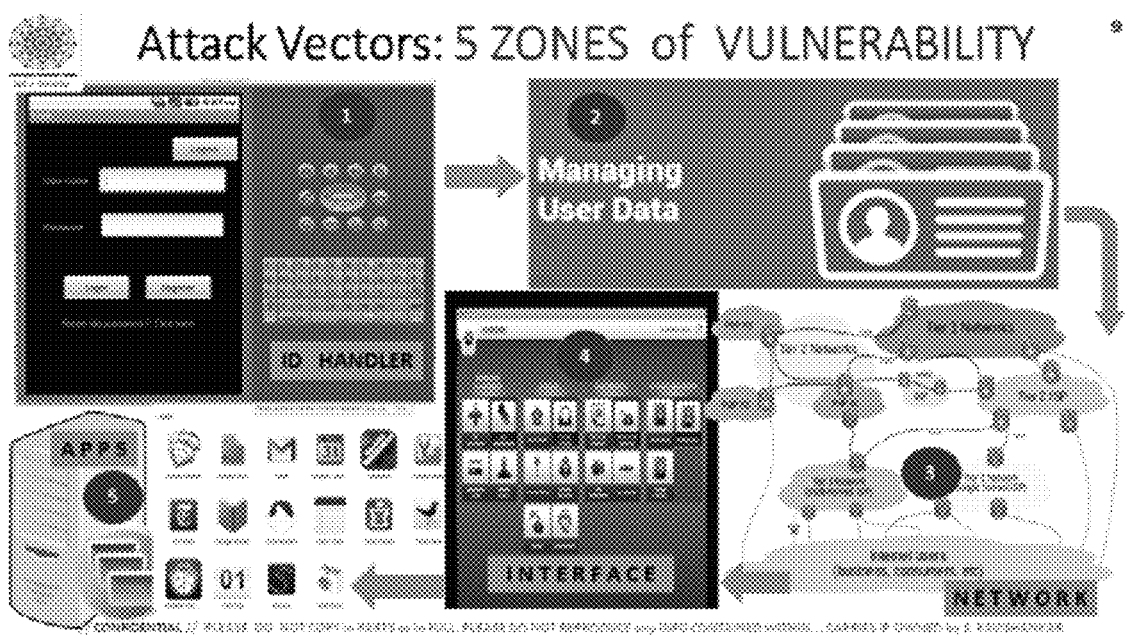
FIG. 6 is a functional block diagram illustrating how the multi-layered security control system addresses the five zones of vulnerability, in a system for a multi-layered security control, according to an embodiment herein.

FIG. 6 is a diagram illustrating how the multi-layered security control system addresses the five zones of vulnerability.

Figure 7:
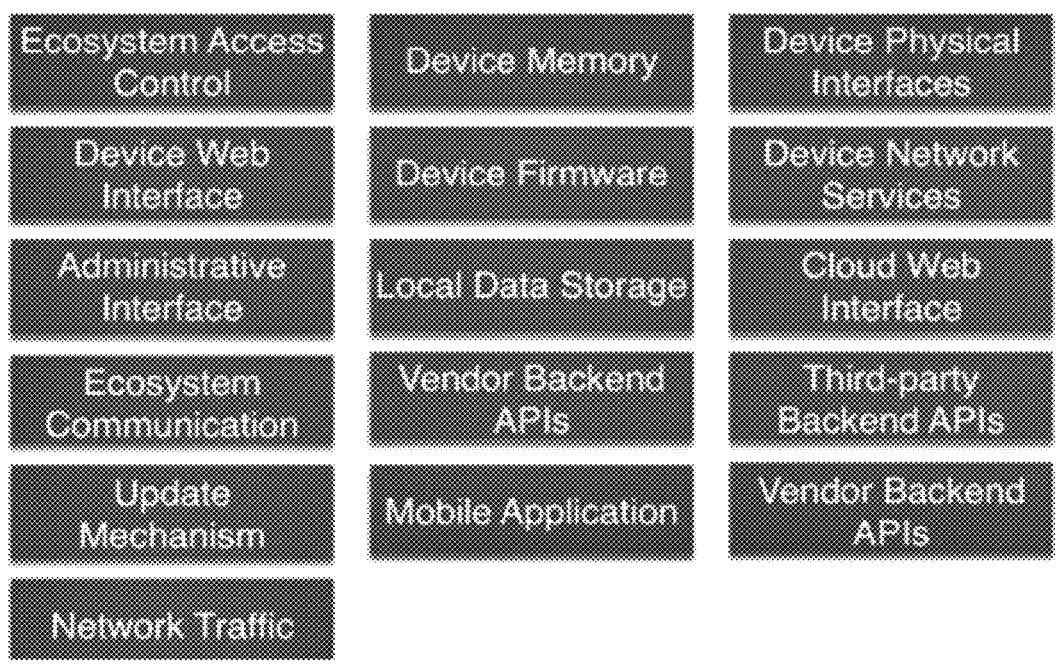
FIG. 7 shows a block diagram of the IoT attack surface areas that are addressed by the multi-layered security control system, according to an embodiment herein.

FIG. 7 shows the IoT attack surface areas that are addressed by the multi-layered security control system. The system tackles the problem areas on an end-to-end basis to provide end-to-end protection.

Figure 8:
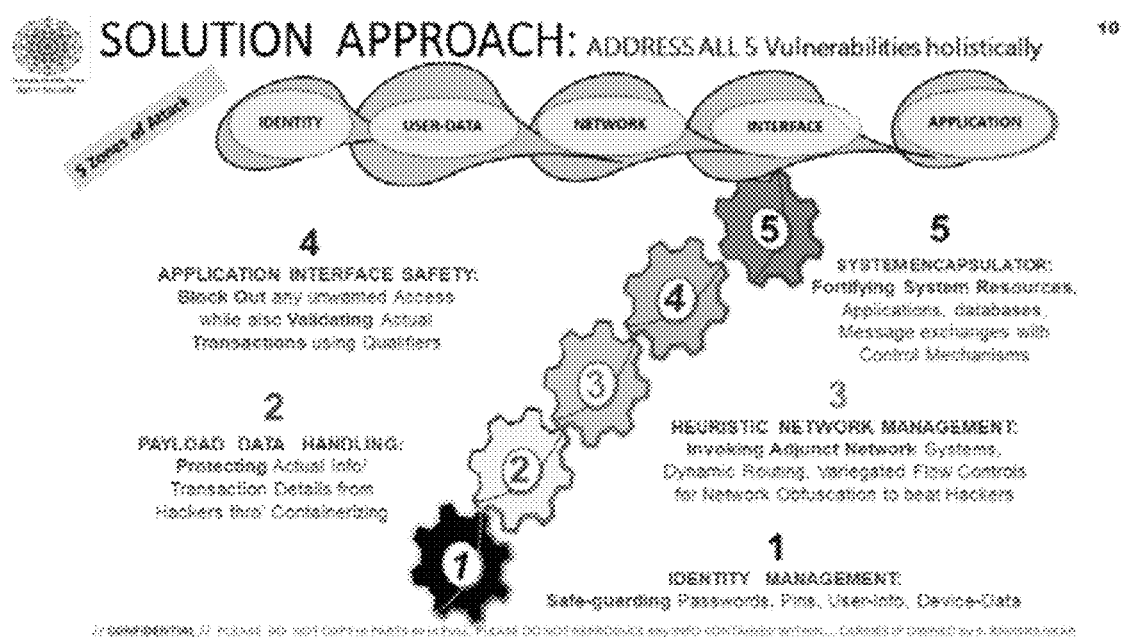
FIG. 8 shows a functional flow chart of a solution-based approach indicating the way in which the security control system addresses the five vulnerabilities, according to an embodiment herein.

FIG. 8 shows a solution based approach as to how the security control system addresses the five vulnerabilities. The system provides a Holistic and Comprehensive across all segments of the entire chain—ID, DATA, Network, Interface, Applications.

According to an embodiment herein, the system is implemented to provide security in a plurality (or rather multiple) of domains including but not limited to Health care, Banking, Retail, MFG etc. Further, the system can be integrated into a plurality of platforms including telecom players, internet service providers, and SCADA/DAS solution platforms for Industrial IoT. The system is also implemented for security control in email management, and business applications. The system provides a security that is contiguous and matrix mapped to ensure protection is active during the entire cycle of an application/transaction.

The foregoing description of the specific embodiments will so fully reveal the general nature of the embodiments herein that others can, by applying current knowledge, readily modify and/or adapt for various applications such as specific embodiments without departing from the generic concept, and, therefore, such adaptations and modifications should and are intended to be comprehended within the meaning and range of equivalents of the disclosed embodiments.

It is to be understood that the phraseology or terminology employed herein is for the purpose of description and not of limitation. Therefore, while the embodiments herein have been described in terms of preferred embodiments, those skilled in the art will recognize that the embodiments herein can be practiced with modifications. However, all such modifications are deemed to be within the scope of the claims.

What is claimed is:

1. A system for providing end-to-end protection and safety for transactions in a computing environment, the system comprising:

an identity management module configured to generate a dynamic user ID to initiate a transaction through an algorithm or application, and wherein the dynamic ID is further configured to embed into a data as a control over a pay load data;

a payload data handling module configured to wrap the data in a container through an algorithm or application, and further segment the data, wherein the segmented data is grouped to form a block of flow-chains;

a heuristic network management module configured to perform routing of water-marked networks for the transmission of the block of chains through an algorithm or application, wherein the heuristic network management module is further configured to enforce multiple levels of access control with network obfuscation techniques in place;

an application interface Manager configured for blocking out unauthorized access during transactions and validating actual transactions by comparing with pre-defined qualifiers through an algorithm or application; and an encapsulator module configured to fortify the system resources, applications, databases, and exchange of message with a control mechanism through an algorithm or application;

wherein the dynamic ID is destroyed on completion of the transaction, and wherein the dynamic ID is configured based on a plurality of parameters selected from a group consisting of global identification numbers (GIN) or numbers assigned to an individual, excerpts from IP address or IOT localized parameters, tokens, GPS-flags, vendor link parameters, any other personal information of user's choice, retina data, finger print data, social security number of individual, personal identification numbers (PIN), and location data as reference for validation, and wherein the application interface manager is configured to work on a Dynamically Distributed Matrix layered Spatially organized Reference Index (DDMLSORI) platform, and wherein the application interface manager is provided with an application data engine and a context modeler comprising a layered database converter (data masking, meta-data-mapper, plenary-filter-analyzer) built around a validation cum control sequencer. and wherein the application interface manager has multi segmented-filters, and wherein the multisegmented filters is configured to dynamically picks or shares or drops. encrypted pay load data from the flow chains while also getting ratified over the Network path to ensure that the packets arrived are without disruption, or is totally intact (not hacked) from origin to destination.

2. The system as claimed in claim 1, wherein the heuristic network management module is further configured to provide customized controls and validation controls to users to customize various degrees of Protection and Safety levels through an algorithm or application.

3. The system as claimed in claim 1, wherein the encapsulator module is configured to provide memory segmenting and a shielding framework for the data through an algorithm or application.

4. A computer implemented method comprising instructions stored on a non-transitory computer readable storage medium and executed on a hardware processor provided in a computing system provided with memory, for providing end-to end protection and safety for transactions in a computing environment, the method comprising steps of:

generating a dynamic user ID to initiate a transaction through an algorithm or application, and wherein the dynamic ID is further embedded into a data as a control over a pay load data;

wrapping the data with dynamically generated user ID in a container using a payload data handling module and further segmenting the data, wherein the segmented data is further grouped to form a block of flow-chains;

performing a routing of water-marked networks for the transmission of the block of flow-chains using a heuristic network management module;

wrapping and packetizing the data dynamically and randomly using an application interface manager for transportation in a controlled environment to a server or cloud to prevent a breaking of breach of data; and providing a memory segmenting in an encrypting form for the data corresponding to transaction using an encapsulator module;

blocking unauthorized access during transactions and validating actual transactions by comparing with pre-defined but dynamically decided qualifiers using an application interface manager that wraps and ensures delivery of a protected container/conduit for data/info-exchange;

wherein the dynamic ID is destroyed on completion of the transaction, and wherein the dynamic ID is configured based on a plurality of parameters selected from a group consisting of (global identification number) GIN or numbers assigned to an individual, excerpts from IP address or IOT localized parameters, Tokens, GPS-flags, vendor link parameters, any other personal information of user's choice, retina data, finger print data, social security number of individual, (personal identification number) PIN, and location data as reference for validation, and wherein the application interface manager is configured to work on a Dynamically Distributed Matrix layered Spatially organized Reference Index (DDMLSORI) platform, and wherein the application interface manager is provided with an application data engine and a context modeler comprising a layered database converter (data masking, meta-data-mapper, plenary-filter-analyzer) built around a validation cum control sequencer, and wherein the application interface manager has multi segmented-filters, and wherein the multisegmented filters is configured to dynamically picks or shares or drops. encrypted pay load data from the flow chains while also getting ratified over the Network path to ensure that the packets arrived are without disruption or is totally intact (not hacked) from origin to destination.

5. The method as claimed in claim 4 further comprises of fortifying system resources, applications, databases, and exchange of message with a control mechanism using the encapsulator module.

* * * * *